March 18, 1930.  1,750,705
G. CHIASSON, KNOWN AS CHISHOLM
NAIL BEDDING MACHINE FOR CLOG MAKING
Filed April 17, 1928    2 Sheets-Sheet 1

INVENTOR.
George Chiasson,
known as Chisholm
By his Attorney,
Nelson W. Howard

March 18, 1930.  G. CHIASSON, KNOWN AS CHISHOLM  1,750,705
NAIL BEDDING MACHINE FOR CLOG MAKING
Filed April 17, 1928   2 Sheets-Sheet 2
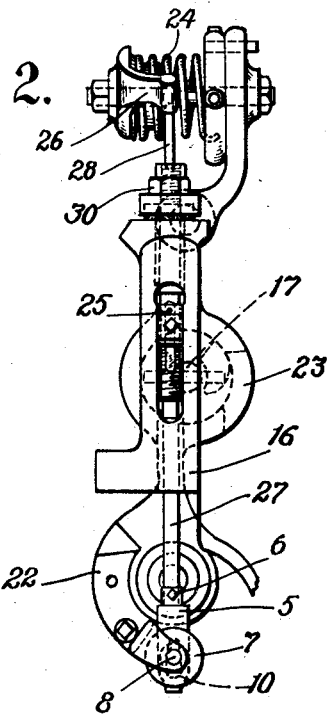
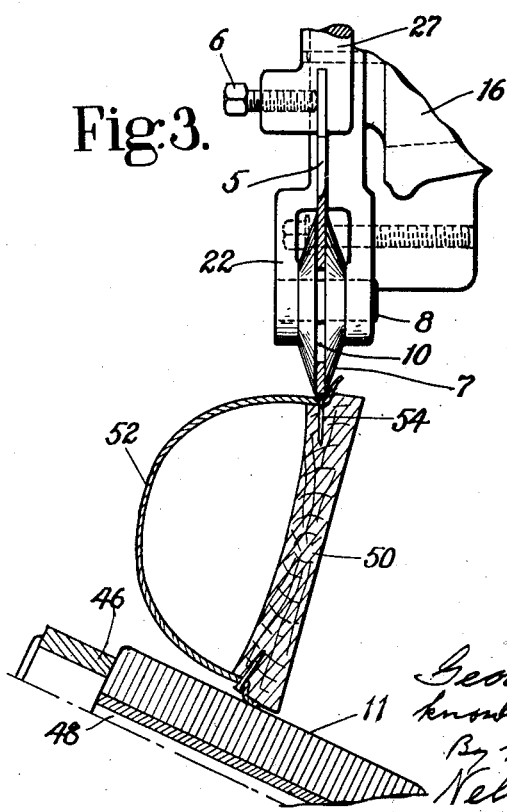

Patented Mar. 18, 1930

1,750,705

UNITED STATES PATENT OFFICE

GEORGE CHIASSON, KNOWN AS CHISHOLM, OF PARIS, FRANCE, ASSIGNOR TO UNITED SHOE MACHINERY CORPORATION, OF PATERSON, NEW JERSEY, A CORPORATION OF NEW JERSEY

NAIL-BEDDING MACHINE FOR CLOG MAKING

Application filed April 17, 1928, Serial No. 270,767, and in Great Britain April 26, 1927.

This invention relates to machines for driving or bedding fastenings used in the manufacture of footwear. It is herein shown as embodied in a machine for bedding the heads of nails which have been previously inserted in clogs and, while particularly useful in this connection, it is of general application and many of its features may be employed to good advantage in machines for inserting nails, tacks or other fastenings, as well as in machines for bedding the heads of such fasteners after their insertion.

In the manufacture of clogs, it is the custom to groove or shoulder the margin of the wooden clog sole. The upper material is formed or creased into the vertex of the groove and the fastening nails then inserted along the line of the vertex. A feature of the invention consists in guiding means of novel form for constraining the driver to follow the desired predetermined path upon grooved work presented to the machine, or for so relatively locating the driver and work that the driver will insert or operate upon a line of fasteners in the groove or in a fixed relation to its vertex. As herein shown, the guiding means comprises a roll, or preferably a pair of rolls mounted one on each side of the driver, and acting positively, continuously and in close cooperation therewith to center or locate the driver in grooved work.

A feature of the invention consists in a construction and arrangement of parts designed to locate a guide roll closely adjacent to a driver where its action will be most effective to maintain the roll accurately and securely in operative position. To this end, the guide roll of the illustrated machine is confined in position between one face of the driver and a suitable support and is mounted on a spindle projecting through a slot formed in the driver. This construction is advantageous in that it permits the guide roll to run in actual contact with the driver, which is the most effective position for the roll, and also makes it possible to employ journals or bearings of adequate size for wearing purposes and strength for rigidity and accuracy.

Other features of the invention relate to a work support for presenting and feeding the work to the action of the driver. In working along the sides of a clog, a mechanical feed for the work is a convenience, whereas in working about the toe and heel ends of the clog the operator usually prefers to advance the work by hand from one fastener to the next. With these conditions in view, the present invention contemplates a work support, including a driven feed roll, which may be moved bodily toward and from the path of the driver in accordance with the thickness of the work and which may be also displaced bodily out of line with the driver path, so that the work may be presented freely to the driver without interference when this is desired.

With these objects in view, another feature of the invention consists in a work support arranged to swing about an axis out of line with the driver and driving connections including intermeshing gears, one of which is bodily movable about the axis of the other to permit the lateral displacement of the work support without disturbing the driving connection. It is believed that a work support of this character has not been heretofore employed, nor has a work support having provision for bodily lateral displacement been known in which provision is also made for a longitudinal adjusting movement in line with the driver path.

These and other features of the invention will be best understood and appreciated from the following description of a preferred embodiment thereof, selected for purposes of illustration and shown in the accompanying drawings, in which Fig. 1 is a view in side elevation, partly in section, of so much of the machine as is necessary to understand the invention;

Fig. 2 is a view in front elevation of the machine head; and

Fig. 3 is a view in side elevation, on an enlarged scale, of the operating parts of the machine with the work in position.

Figure 1:
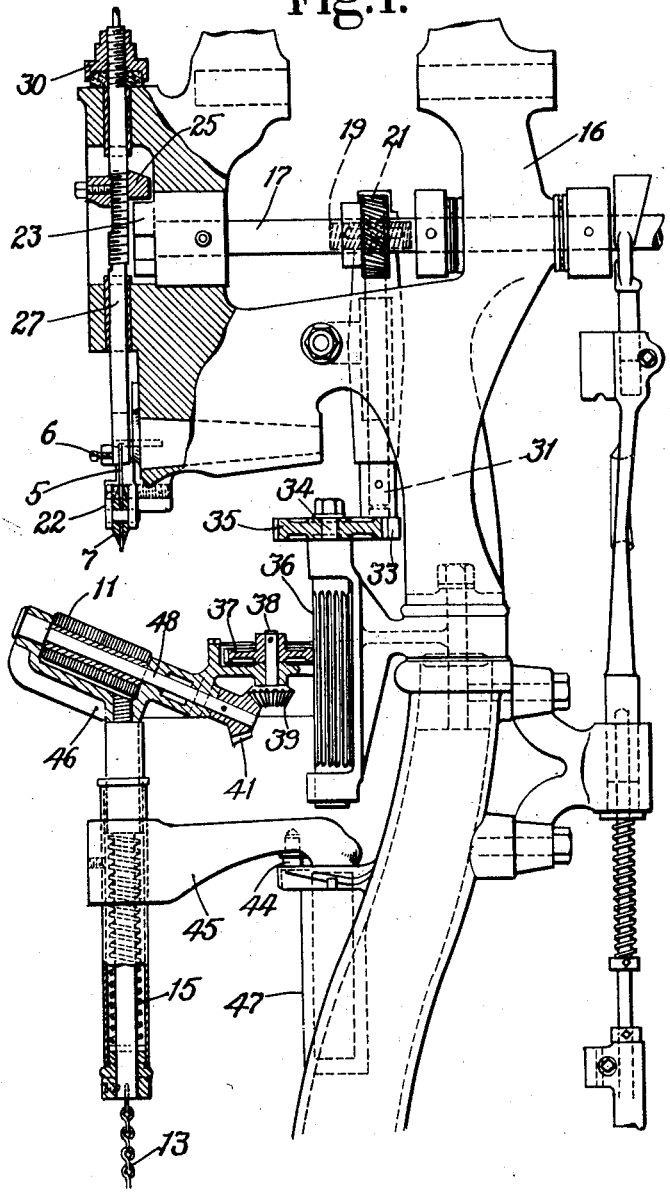

The invention is herein shown as embodied in a machine of well-known construction, such for example as that shown in U. S. Letters Patent No. 896,293, dated August 18, 1908, to which reference may be made for further details of the frame, driving mechanism and clutch.

The operating shaft 17 of the machine is journaled in the head frame 16 and provided at its forward end with a cam 23 which acts to lift the driver bar 27 through a lifting block 25 and then release the block at the top of its stroke so that the driver bar may descend. The driver bar is lifted against the tension of a torsion spring 24, acting on the upper end of the driver bar through a lever 26 and a thrust piece 28. At its lower end, the driver bar 27 is provided with a socket for a removable driver or hammer 5, retained in place by a clamping bolt 6. The driver 5 comprises a flat hardened bar of substantial width, being slightly reduced at its lower end.

A curved support 22 is secured to the head frame at a point above the driver 5, being forked at its free end and extending from a position at one side of the driver forwardly to a position opposite the median line thereof. A pair of guide rolls 7 are interposed between the forks of the support 22 and the opposite faces respectively of the driver 5. The guide rolls 7 are mounted to rotate freely upon a transverse spindle 8 extending between the forks of the support 22 and passing through a longitudinal slot 10 provided in the driver for that purpose. The peripheral edge of each roll 7 is tapered or beveled away from the driver so that the two rolls and the driver constitute a compact tapering tool, adapted to be inserted in a groove or shoulder and to find the vertex thereof. The spindle 8 is of substantial size and the inner faces of the rolls 7 bear over a substantial area of the plane surfaces of the driver. The rolls are thus confined accurately in position, true running is insured and favorable wearing conditions provided. The rolls 7 are so disposed with reference to the path of the reciprocating driver 5 that the latter extends slightly beyond the periphery of the rolls at the conclusion of its driving stroke, as indicated in Fig. 2. This distance may be adjusted and regulated by adjusting the driver bar vertically by means of a limit stop 30 provided at its upper end.

The work support comprises a roll 11 built up of laminations of felt or other suitable material and mounted to rotate with a shaft 48 disposed transversely to the path of the driver and at an inclination. The roll shaft 48 is journaled in a carrier member 46, having a downwardly extending stem which is received in a bracket 45. The stem of the carrier 46 is telescopic. The upper section thereof is normally maintained in elevated position against a stop by a compression spring 15 and is connected through a rod and chain 13 to a treadle, by which it may be depressed when desired. The bracket 45 is angular in shape and has a vertical stem which is journaled in a boss 47, formed in the frame of the machine, the arrangement being such that the bracket with the roll may be swung bodily about a vertical axis. The bracket carries a locking detent 44 which cooperates with grooves in the upper surface of the boss 47 to locate the bracket with the roll 11 either in line with the path of the driver or revolved through 90 degrees to an inoperative position.

Geared driving connections for the roll shaft 48 are provided which permit the movement of the roll with the bracket 45 without disturbing the connection. The roll shaft 48 is provided at its inner end with a bevel gear 41 which meshes with a bevel gear 39, mounted upon the lower end of a short vertical shaft 38 journaled in a part of the carrier 46. At its upper end, the shaft 38 carries a pinion 37 which, in turn, meshes with an elongated pinion 36 fast to a vertical shaft 34 journaled in bearings in the machine frame in alignment with the axis of movement of the bracket 45. The shaft 34 carries at its upper end a pinion 35, meshing with a pinion 33 on the lower end of another vertical shaft 31 journaled in the machine frame and carrying at its upper end a helical gear 19, meshing with a corresponding gear 21 on the opearting shaft 17. It will be apparent, therefore, that while the elongated pinion 36 is constantly driven, the bracket 45 may be swung transversely, carrying the pinion 37 about the axis of the pinion 36 but in no way affecting the driving connection. The carrier 46 may also be moved vertically, sliding the pinion 37 upon the teeth of the elongated pinion 36 and maintaining a driving connection in all positions.

In using the machine above described for bedding nails in clogs, the work is presented as indicated in Fig. 3, wherein the grooved clog sole 50 is shown in cross section with the upper 52 in place thereon and creased or molded into the vertex of the groove. In this case, the nails 54 have been previously inserted and the function of the machine is now to beat down the nails and bed their heads in the material of the upper. The work support is depressed by the operator and the clog presented to the bedding tool, comprising the guide rolls 7 and the driver 5. In working along the sides of the clog, the latter is supported yieldingly against the compression of the spring 15 in the position indicated in Fig. 3. The driver or hammer 5 reciprocates at a high rate of speed between the guide rolls which center the driver in the vertex of the groove and cause it to follow the line of the vertex as the clog is advanced beneath it. The rotation of the roll 11 feeds the work from one end of the clog to the other.

When the toe or heel end of the clog is reached and the operator desires to swing it into a more or less vertical position, the feed roll 11 with its support is swung transversely to one side or the other and the roll carried bodily out of the path of the driver, whereupon the operator is free to manipulate the work as he may desire and to feed the toe or heel portions thereof into operative position.

Having thus described my invention, what I claim as new and desire to secure by Letters Patent is:

1. A machine of the class described, having in combination a reciprocatory driver, and guiding means movable transversely to the driver path at the operating point and being disposed on both sides of the driver and acting continuously to constrain the driver to follow a predetermined path upon grooved work presented to the machine.

2. A machine of the class described, having in combination a reciprocatory driver, and movable guiding means disposed symmetrically upon both sides of the driver and acting to center the driver in grooved work presented to the machine.

3. A machine of the class described, having in combination a reciprocatory driver, and guide rolls disposed with the driver between them and having their acting faces inclined toward an intersection in the plane of the driver path.

4. A machine of the class described, having in combination an intermittently acting driver, and a guide roll mounted to rotate on an axis intersecting the path of the driver and having its peripheral surface tapered away from the driver.

5. A machine of the class described, having in combination an intermittently acting driver, and a guide roll mounted to rotate adjacent to the driver on an axis intersecting the path of the driver and having its peripheral surface tapered away from the driver and so disposed with reference to the driver path that the driver moves beyond the periphery of the roll at the conclusion of each stroke.

6. A machine of the class described, having in combination a reciprocatory driver bar, a driver carried thereby, a support located at one side of the driver bar and extending at one end into proximity to the driver, and guide rollers mounted in said support and disposed one on each side of the driver.

7. A machine of the class described, having in combination a flat reciprocatory driver having a longitudinal slot, a support forked to embrace said driver, a spindle extending between the forks of the support through the slot in the driver, and guide rolls journaled on the spindle at each side of the driver.

8. A machine of the class described, having in combination a flat reciprocatory driver having a longitudinal slot, a spindle projecting into said slot, and a guide roll mounted to rotate about the axis of said spindle and having a plane face engaging the side of the driver.

9. A machine of the class described, having in combination a flat reciprocatory driver having a longitudinal slot, a spindle projecting into said slot, a support spaced from the driver and having a face parallel thereto, and a guide roll mounted upon the spindle and confined between the faces of the support and driver.

10. A machine of the class described, having in combination a driver, a cooperating driven work supporting roll, and driving connections including intermeshing gears one of which is bodily movable about the axis of the other to permit displacement thereof together with the work support without disturbing the driving connection.

11. A machine of the class described, having in combination a driver, a cooperating work support comprising a driven roll, a bracket therefor arranged to swing about an axis substantially parallel to the path of the driver, a driving gear rotating about an axis coincident with that of the bracket, and driving connections between said gear and roll.

12. A machine of the class described, having in combination a driver, a cooperating work support comprising a roll journaled on an axis extending transversely to the path of the driver, a bracket therefor arranged to swing for carrying the roll bodily out of alignment with the driver, and geared driving connections to the roll including a pinion mounted in the bracket and an intermeshing driving gear mounted to rotate about an axis coincident with that of the bracket.

13. A machine for driving nails, having in combination a reciprocatory driver, a cooperating work support comprising a roll mounted to rotate about an axis transverse to the path of the driver, a bracket for the roll mounted to move bodily with the roll both toward and from the driver and also transversely to its path, and geared driving connections effective in all positions of the bracket and roll.

14. A machine of the class described, having in combination a reciprocatory driver, a cooperating work support comprising a bracket arranged to swing about an axis out of line with the driver, a carrier member mounted in said bracket for movement in line with the path of the driver, a feed roll journaled in said carrier member, an elongated pinion mounted in line with the axis of the bracket, and geared connections between said pinion and roll permitting movement thereof bodily both in line with the driver path and transversely thereto.

15. In a machine of the class described, a fastener bedding tool comprising guide rolls with a movable driver between them, in combination with a work support comprising a movable bracket, a driven feed roll mounted therein and maintained in operative relation to the bedding tool in one position of the bracket for feeding the work to the tool and movable with the bracket to an inoperative position to permit hand feeding of the work when desired.

16. In a machine of the class described, a fastener bedding tool comprising narrow beveled guide rolls with a flat driver between them, in combination with a work support comprising a bracket arranged to be locked in operative position in line with the bedding tool or in an inoperative position remote from said tool, a driven feed roll mounted in the bracket and geared connections thereto designed to permit movement of the bracket without disturbance to the connection.

17. A machine for driving fastenings having, in combination, a reciprocatory driver, a work support arranged to support a work piece presented to the driver and comprising a roll extending transversely across the path of the driver and mounted to rotate about an axis transverse to the path of the driver, a bracket carrying the roll and mounted to move bodily with the roll both toward and from the driver and also transversely of the path of the driver, and gearing effective in all positions of the bracket and roll to drive the roll.

In testimony whereof I have signed my name to this specification.

GEORGE CHIASSON known as CHISHOLM.